United States Patent [19]

Goel et al.

[11] Patent Number: 4,746,719
[45] Date of Patent: May 24, 1988

[54] RAPID PREPARATION OF POLYETHERAMIDE FROM BIS-OXAZOLINE, POLYPHENOL AND CARBONIUM ION SALT CATALYST

[75] Inventors: Anil B. Goel, Worthington; Omar Tiba, Dublin, both of Ohio

[73] Assignee: Ashland Oil, Inc., Ashland, Ky.

[21] Appl. No.: 57,476

[22] Filed: Jun. 3, 1987

[51] Int. Cl.$^4$ .................. C08G 8/10; C08G 85/00; C08G 69/00
[52] U.S. Cl. .................. 528/137; 528/129; 528/138; 528/139; 528/141; 528/211
[58] Field of Search .............. 528/211, 129, 137, 138, 528/139, 141

[56] References Cited

U.S. PATENT DOCUMENTS

| | | | |
|---|---|---|---|
| 4,430,491 | 2/1984 | Culbertson et al. | 528/211 |
| 4,613,662 | 9/1986 | Goel | 528/211 |
| 4,699,970 | 10/1987 | Tiba et al. | 528/211 |

*Primary Examiner*—Harold D. Anderson
*Attorney, Agent, or Firm*—John F. Jones

[57] ABSTRACT

A process for preparing copolymers of a mixture of a bis-oxazoline and a polyphenolic compound at improved rate of copolymerization by the inclusion of a catalytic amount of a carbonium ion salt of the formula $Ph_3CX$ wherein Ph represents a phenyl group and X represents $BF_4$, $PF_6$, $SbF_6$, $AsF_6$, $BPh_4$ or $ClO_4$, is described.

12 Claims, No Drawings

RAPID PREPARATION OF POLYETHERAMIDE FROM BIS-OXAZOLINE, POLYPHENOL AND CARBONIUM ION SALT CATALYST

This invention relates to a process for the rapid copolymerization of bis-oxazolines and polyphenolic compounds comprising carrying out the copolymerization in the presence of certain carbonium salt catalysts.

U.S. Pat. No. 4,430,491 describes the formation of poly(ether amide) containing thermoplastic polymers by the reaction of a bis-oxazoline with a diphenolic material and the formation of thermosetting polymers by the reaction of a bis-oxazoline with a polyphenolic material. The copolymerization reactions have been shown to proceed at a very slow rate requiring long reaction times at elevated temperatures to form useful polymeric products having excellent physical properties.

I have discovered that certain carbonium salts corresponding to the formula $Ph_3CX$ wherein Ph represents a phenyl group and X represents $BF_4$, $PF_6$, $SbF_6$, $AsF_6$, $BPh_4$, or $ClO_4$) catalyze the foregoing reaction so as to greatly increase the rate of polymerization and cure process.

Reactions of bis-oxazolines with bis-phenolics such as resorcinol or Bisphenol-A have been shown in U.S. Pat. No. 4,430,491 to give thermoplastic polymeric compositions containing poly(ether amide) groups. The use of polyphenolics (compounds having more than two phenolic groups per molecule) resulted in thermoset polymers, however, the reaction rates were quite slow requiring long reaction times at high temperatures (about 200 degrees C.).

I have found that carbonium salts of general formula $Ph_3CX$ as defined above rapidly catalyze the homopolymerization and copolymerization reaction of bis- and polyoxazolines with bis- and polyphenolics to give rapidly curing thermosetting polymeric compositions.

The bis-oxazolines embodied in this invention include those having the formula I

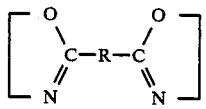

wherein R represents an alkylene group having from 1 to 20 carbon atoms, or an arylene group having from 6 to 20 carbon atoms.

Although the reaction of a bis-oxazoline of formula I is carried out with bis-phenolics such as resorcinol in proportions such that the bis-oxazoline is always in excess (i.e., bis-oxazoline/bisphenol is greater than 1) at temperatures of 150 to 250 degrees C., it provides a thermoplastic polymer soluble in solvents such as dimethyl formamide and N-methyl pyrrolidone, the same reaction in the presence of a small amount of the carbonium salt catalyst of this invention results in an infusible thermosetting polymer and the polymerization takes place at a very rapid rate.

The polyphenolic compounds useful in the process of this invention include both bis-phenols and polyphenols and can better be defined as compounds having two or more phenolic hydroxyl groups per molecule. Polyphenolic compounds of this type include bisphenols, various benzene and fused aromatic ring diols and triols, e.g., 1,4-benzene diol (hydroquinone), 1,3-benzene diol (resorcinol), 1,4-naphthalene diol and 1,3,5-benzene triol; the biphenyl diols, e.g., [1,1'-biphenyl]-2,2'-methylene bisphenol, 4,4'-(methylethylidene) bisphenol (Bisphenol-A), 4,4'-(phenylmethylene) bisphenol, 4,4'-(cyclohexanediyl) bisphenol, 4,4'-(1,2-diethyl-1,2-ethenediyl) bisphenol, and 3,4-bis(4-hydroxyphenyl)-2,4-hexadiene; the arylene bisphenols, e.g., 4,4'-phenylene bisphenol; the oxy, thio and sulfonyl bisphenols, e.g., 2,3-oxybisphenol, 4,4'-thiobisphenol and 2,2'-sulfonyl bisphenol; the bis(hydroxyaryl) alkanones, e.g., bis (4-hydroxyphenyl) methanone, 1,5-dihydroxy-9,10-anthracenedione and 4-[bis(4-hydroxyphenyl) methylene]-2,5-cyclohexadien-1-one; the various benzamide and benzoate derivatives, e.g., 1-hydroxy-N-(4-hydroxyphenyl) benzamide, 4-hydroxy-hydroxyphenyl benzoate, 2-methyl-2[(4-hydroxybenzoyl)oxymethyl]1,3-propanediyl-4-hydroxybenzoate, bis (4-hydroxy benz benzoate)-1,2-ethandiyl; 1,2-ethandiyl; 2-(4-hydroxy benzoate) ethyl ether, bis (4-hydroxy benzamide)-1,6-hexanediyl and bis (4-hydroxy benzamide)-1,4-benzenediyl and the like. Phenol-formaldehyde condensation compounds such as resols and novolacs are included in this invention. The polymerization process of this invention is preferably carried out at a temperature in the range of from about 120° to 200° C.

The amount of catalyst used in the process of this invention is in the range of from about 0.1 to about 8% by weight based on the weight of the total bis-oxazoline and polyphenolic compound, preferably, in the range of from about 0.4 to 5% by weight. The equivalent ratio of polyphenolic compound to bis-oxazoline used in the process of this invention should fall in the range of from 60:40 to 10:90, respectively. It has been found that in the copolymerization reaction of bis-oxazolines and polyphenolics that other reactive additives such as polyepoxide resins may also be included in the polymerization mixture. In such cases, the polyepoxide also undergoes homo- and copolymerization reactions along with the other monomers present. The amount of polyepoxide may be in the range of from 0 to 60% by weight based on the total weight of the polymerization mixture. Fillers, pigments, plasticizers, fibers and the like may also be included in the process of this invention.

The invention is further illustrated in the following representative examples.

EXAMPLE 1

Resorcinol (1 g) and $Ph_3CBF_4$ (0.08 g) were heated at about 120 degrees C. to give a purple/red colored solution. To this solution was added with mixing 5 g of bis-oxazoline of formula I wherein R represents a 1,3-phenylene group and the resulting mixture was heated at 170 degrees C. A rapid gelation occurred within one minute to give an infusible thermoset polymer. The product was postcured at 170 degrees C. for 30 minutes and was found to have no observable glass transition temperature ($T_g$) by DSC (Differential Scanning Calorimetry) below 200 degrees C., and a 5% weight loss in nitrogen by TGA (Thermogravimetric Analysis) occurred at about 390 degrees C.

EXAMPLE 2

This example is given for purpose of comparison and is outside the scope of the present invention. The procedure of Example 1 was repeated except that no $Ph_3CBF_4$ catalyst was used. After heating the mixture for two hours at 170 degrees C. a thermoplastic material was formed which was found to have a melting point of 73 degrees C. and the product was completely soluble in solvents such as N-methyl pyrrolidone.

EXAMPLE 3

The procedure of Example 1 was followed using 5 g of the bis-oxazoline and 2 g of resorcinol containing 0.1 g of Ph₃CBF₄ catalyst. The reaction mixture, upon heating at 170 degrees C., gelled within one minute to give an infusible thermosetting polymer showing a $T_g$ of 168 degrees C. and a 5% weight loss by TGA at 374 degrees C.

EXAMPLE 4

The procedure of Example 1 was followed using 5 g of the bis-oxazoline, 2 g of Bisphenol-A containing 0.1 g of Ph₃CBF₄ catalyst and heating the reaction mixture at 170 degrees C. Gellation occurred in 1.2 minutes at this temperature to give an infusible thermoset polymer having no observable $T_g$ by DSC below 200 degrees C. and showing a 5% weight loss by TGA at 374 degrees C.

EXAMPLE 5

The procedure of Example 1 was followed using 10 g of the bis-oxazoline, 4.5 g of Alnovol (phenol/formaldehyde condensation product a novolac from American Hoechst Co.) and 0.15 g of Ph₃CBF₄. The resulting mixture when heated at 170 degrees C. gelled in 1.3 minutes to give an infusible thermosetting polymer having a $T_g$ of about 185 degrees C. and a 10% weight loss by TGA occurred at 372 degrees C.

EXAMPLE 6

This example is for comparison purposes and is outside the scope of the present invention. The procedure of Example 1 was followed using the reaction charge of Example 5 except that no catalyst was used. The mixture upon heating at 170 degrees C. did not gel in 30 minutes, indicating the copolymerization reaction without the catalyst to be extremely slow.

EXAMPLE 7

The procedure of Example 1 was followed using a mixture of 5 g of the bis-oxazoline, 2 g of a bis-oxazoline of formula I in which R is a 1,4-phenylene group and 2 g of resorcinol containing 0.1 g of Ph CBF catalyst. The resulting reaction mixture upon heating at 172 degrees C. gelled in about one minute to give an infusible thermoset polymer having a $T_g$ of 185 degrees C. and showing a 5% weight loss by TGA at 372 degrees C.

EXAMPLE 8

To a mixture of the bis-oxazoline of Example 1 (5 g) and 2 g of liquid diglycidyl ether of Bisphenol-A was added 2 g of resorcinol containing 0.12 g of Ph₃CBF₄ catalyst. The resulting reaction mixture gelled in about 1.4 minutes when heated at 168 degrees C. to give a thermoset polymer having a $T_g$ of 135 degrees C. and showing a 5% weight loss by TGA at 370 degrees C.

I claim:

1. The process for preparing a polymeric composition comprising reacting a mixture of a polyphenolic compound and a bis-oxazoline compound in the presence of a carbonium ion salt having the formula Ph₃CX wherein Ph represents a phenyl group and X represents BF₄, PF₆, SbF₆, AsF₆, BPh₄ or ClO₄.

2. The process of claim 1 carried out at a temperature in the range of from about 120° C. to 200° C.

3. The process of claim 2 wherein the bis-oxazoline compound is one having the formula:

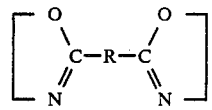

wherein R represents an alkylene group having from 1 to 20 carbon atoms or an arylene group having from 6 to 20 carbon atoms 4. The process of claim 3 wherein the equivalent ratio of polyphenolic compound to bis-oxazoline compound is in the range of from 60:40 to 10:90.

5. The process of claim 4 wherein the carbonium ion salt is present in from about 0.1 to about 8% by weight based on the weight of the total bis-oxazoline comopund and polyphenolic compound.

6. The process of claim 5 wherein the polyphenolic compound is one which contains two or more phenolic hydroxyl groups per molecule.

7. The process of claim 6 wherein the bis-oxazoline is one in which R is a phenylene group.

8. The process of claim 7 wherein the carbonium ion salt is Ph₃CBF₄.

9. The process of claim 8 wherein the polyphenolic compound is resorcinol.

10. The process of claim 8 wherein the polyphenolic compound is Bisphenol-A.

11. The process of claim 8 wherein the polyphenolic compound is a phenol-formaldehyde condensation product.

12. The process of claim 9 wherein R is both a 1,3-phenylene group and a 1,4 phenylene group.

* * * * *